No. 768,333. Patented August 23, 1904.

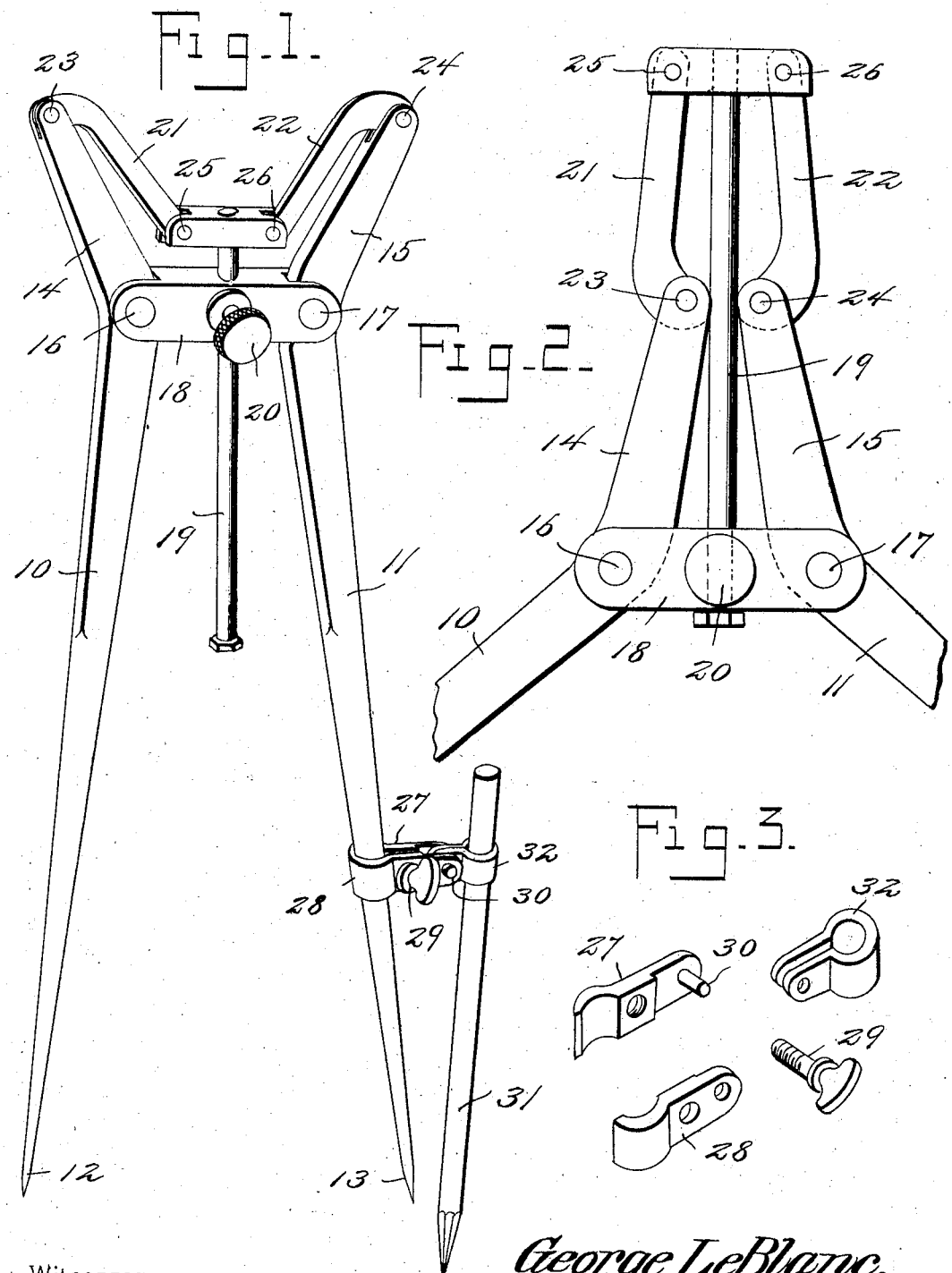

UNITED STATES PATENT OFFICE.

GEORGE LE BLANC, OF BEECHER FALLS, VERMONT.

COMPASSES.

SPECIFICATION forming part of Letters Patent No. 768,333, dated August 23, 1904.

Application filed July 11, 1904. Serial No. 216,093. (No model.)

*To all whom it may concern:*

Be it known that I, GEORGE LE BLANC, a citizen of the United States, residing at Beecher Falls, in the county of Essex and State of Vermont, have invented a new and useful Compass, of which the following is a specification.

This invention relates to dividers or compasses employed by carpenters and other mechanics, and has for its object to provide a simply-constructed and convenient implement which may be quickly adjusted to any desired degree and firmly locked in position.

Another object of the invention is to provide a simply-constructed and conveniently-arranged pencil or scriber holder for attachment to one of the legs of the implement.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a perspective view of the improved implement in one of its positions. Fig. 2 is a side view of the upper portion of the same, showing the implement in another of its positions. Fig. 3 represents the parts forming the pencil or scriber holding attachment disconnected.

The improved implement comprises two leg members 10 11, pointed at one end, as at 12 13, and with the other ends bent in opposite directions, as at 14 15. Pivoted by its ends at 16 17 to the members 10 11 at the "elbows" of the bends is a "head" member 18, and mounted for movement centrally through this head member is a rod 19, the head member having a set-screw 20 for holding the rod at any desired point in the head member. Connecting one end of the rod 19 respectively to the bent portions 14 15 of the leg members are links 21 22, being pivoted, as at 23 24, to the leg members and at 25 26 to the rod, as shown. By this simple means it will be obvious that the pointed ends of the leg members may be distended to any desired extent within the range of the links 14 15 and the length of the rod 19 and clamp them firmly in any desired position by means of the set-screw 20.

When a relatively short distention of the leg members is required, the rod 19 will be adjusted inwardly or toward the pointed ends 12 13, as in Fig. 1; but when a greater range is desired the rod will be adjusted outwardly, as in Fig. 2, which will permit the pointed ends of the legs to be distended to a much greater extent, as will be obvious. Thus the implement can be very readily adapted to the work required of it.

A pencil or scriber supporting attachment is provided consisting of two clamp-plates 27 28, having recesses at one end for engaging one of the leg members from opposite sides and clamped thereon, as by clamp-screw 29, and with a pin 30 on one of the plates at the other end for extension through an aperture in the other plate. The pencil or scriber 31 is surrounded by a resilient clip 32, having ends projecting between the plates 27 28 and engaged by the pin 30. By this arrangement it will be obvious that the plates 27 28 may be adjusted to any desired point on the leg member to which they are attached and the pencil or scriber 31 likewise adjusted to any desired degree and clamped firmly in position by the single clamp-screw 29.

This makes a very convenient and efficient implement for all the purposes for which similar implements are designed and may be inexpensively and strongly manufactured.

The implements may be of any desired size and of any suitable material.

Having thus described the invention, what is claimed is—

1. In an implement of the class described, leg members pivotally connected intermediately of the same to a head member, a rod movable through said head member and connected by links respectively to the shorter ends of said leg members and means operative in said head member for adjustably locking said rod in said head member.

2. In an implement of the class described, leg members reversely bent at one end and pointed at the other end, a head member pivoted to said leg members at the bends in the same, a rod movable through said head member, links movably connecting the bent ends of said leg members and said rod, and means for adjustably locking said rod to said head member.

3. In an implement of the class described, leg members pivotally connected intermediately of the same to a head member, a rod movable through said head member and connected by links respectively to the shorter ends of said leg members, means operative in said head member for adjustably locking said rod in said head member, clamp-plates embracing one of said leg members and connected by a clamp-screw, and a clip for supporting a pencil or scriber and pivotally connected between the free ends of said clamp-plates.

In testimony that I claim the foregoing as my own I have hereto affixed my signature in the presence of two witnesses.

GEORGE LE BLANC.

Witnesses:
   J. N GOMACHE,
   J. D. DION.